(12) United States Patent
Berger et al.

(10) Patent No.: US 10,821,597 B2
(45) Date of Patent: Nov. 3, 2020

(54) MULTIDIMENSIONAL STORAGE

(71) Applicant: Plano Molding Company, Plano, IL (US)

(72) Inventors: Ryan R. Berger, Columbus, OH (US); James H. Lua, Columbus, OH (US); Ludwin M. Mora, Columbus, OH (US); Clark P. McCune, Roanoke, TX (US); John H. Whalen, Sheridan, IL (US); Raymond R. Harpham, Columbus, OH (US); Sean W. Svendsen, Columbus, OH (US)

(73) Assignee: PLANO MOLDING COMPANY, LLC, Plano, IL (US)

( * ) Notice: Subject to any disclaimer, the term of this patent is extended or adjusted under 35 U.S.C. 154(b) by 0 days.

(21) Appl. No.: 16/025,737

(22) Filed: Jul. 2, 2018

(65) Prior Publication Data

US 2019/0009404 A1      Jan. 10, 2019

Related U.S. Application Data

(60) Provisional application No. 62/529,082, filed on Jul. 6, 2017.

(51) Int. Cl.
*B25H 3/02* (2006.01)
*B65D 21/02* (2006.01)
(Continued)

(52) U.S. Cl.
CPC .............. *B25H 3/028* (2013.01); *B25H 3/022* (2013.01); *B65D 21/02* (2013.01); *A01K 97/06* (2013.01);
(Continued)

(58) Field of Classification Search
CPC ........ B25H 3/028; B25H 3/022; B65D 21/02; B65D 81/3216; B65D 81/321; B63B 2035/738; B63B 2035/715; A01K 97/06
(Continued)

(56) References Cited

U.S. PATENT DOCUMENTS 2,539,302 A * 1/1951 Fye .................. A01K 97/06
220/520
2,936,066 A * 5/1960 Bernard ............ A01K 97/06
312/324
(Continued)

FOREIGN PATENT DOCUMENTS

CN       205813330       12/2016

OTHER PUBLICATIONS

Casey, Reed. ICAST 2017—Plano V-Crate. YouTube [online] [video], Jul. 14, 2017 [retrieved on Oct. 25, 2018]. Retrieved from <https://www.youtube.com/watch?v=nqY-kNZNcaE> Jul. 14, 2017 (Jul. 14, 2017) Entire video.

*Primary Examiner* — Kareen K Thomas
(74) *Attorney, Agent, or Firm* — Leason Ellis LLP

(57) ABSTRACT

A multidimensional storage system is disclosed that provides optimal accessibility, flexibility, and adaptability. The storage system can include an elevated v-shape that can position storage containers closer to an angler's sides. The angled shape of the storage system can facilitate easier access to storage containers stored behind an angler. A bulk storage space provided in storage system can be used to stow items. The storage system can include a waterproof compartment in its base for dry storage.

17 Claims, 9 Drawing Sheets

(51) Int. Cl.
*B65D 81/32* (2006.01)
*A01K 97/06* (2006.01)
*B63B 34/00* (2020.01)
*B63B 34/26* (2020.01)

(52) U.S. Cl.
CPC ............ *B63B 34/05* (2020.02); *B63B 34/26* (2020.02); *B65D 81/3216* (2013.01)

(58) Field of Classification Search
USPC ..... 220/23.4, 23.2, 23.6, 23.8, 23.83, 23.86, 220/4.01, 4.26, 4.28, 4.29–4.33; 206/503, 206/504; 312/262
See application file for complete search history.

(56) References Cited

U.S. PATENT DOCUMENTS

| | | | | |
|---|---|---|---|---|
| 3,545,809 | A * | 12/1970 | Krenz | A01K 97/22 312/235.2 |
| 3,713,529 | A * | 1/1973 | Meksula | A01K 97/06 312/272 |
| 3,786,972 | A * | 1/1974 | Alley | B62J 9/00 224/417 |
| 4,491,258 | A * | 1/1985 | Jones | B62J 9/00 224/153 |
| 4,717,024 | A * | 1/1988 | Djezovic | A45C 5/005 150/119 |
| 4,813,542 | A * | 3/1989 | Thompson | B65D 21/02 190/37 |
| 4,953,601 | A | 9/1990 | Herdies et al. | |
| D325,123 | S * | 4/1992 | Tiramani | D3/275 |
| 5,469,999 | A * | 11/1995 | Phirippidis | B60R 5/04 220/23.4 |
| 5,544,792 | A * | 8/1996 | Arnwine | A45C 7/0086 224/153 |
| 5,628,443 | A * | 5/1997 | Deutsch | A45C 7/0086 150/113 |
| 5,915,554 | A * | 6/1999 | Hung | B65D 51/002 206/372 |
| 6,138,827 | A * | 10/2000 | Marshall | B25H 3/00 206/373 |
| 6,176,559 | B1 * | 1/2001 | Tiramani | B25H 3/023 280/47.19 |
| 6,533,138 | B2 * | 3/2003 | Chwen-Ru | B25H 3/023 206/373 |
| 6,793,106 | B1 | 9/2004 | Kerry | |
| 7,334,680 | B2 * | 2/2008 | Cunningham | B25H 3/023 206/372 |
| 7,780,026 | B1 * | 8/2010 | Zuckerman | B65D 21/0202 206/504 |
| D671,316 | S * | 11/2012 | Kritzler | D3/279 |
| 8,567,796 | B2 * | 10/2013 | Bar-Erez | B25H 3/023 280/47.18 |
| 8,973,196 | B2 * | 3/2015 | Tomasiak | A47L 5/365 15/3 |
| 9,469,024 | B2 * | 10/2016 | Bensman | B25H 3/023 |
| 9,550,605 | B1 * | 1/2017 | Summers | B65D 21/0215 |
| D815,434 | S * | 4/2018 | Bowen | D3/279 |
| 2002/0117414 | A1 * | 8/2002 | Kipper | B25H 3/028 206/373 |
| 2003/0015445 | A1 * | 1/2003 | Levy | B25H 3/023 206/373 |
| 2005/0050791 | A1 | 3/2005 | Placek | |
| 2008/0093238 | A1 * | 4/2008 | Handelman | A63B 47/007 206/315.91 |
| 2017/0045217 | A1 * | 2/2017 | Bowden | F21V 33/0084 |
| 2018/0049420 | A1 * | 2/2018 | Dollahite | A01K 97/06 |

\* cited by examiner

MULTIDIMENSIONAL STORAGE

CROSS REFERENCE TO PRIOR APPLICATIONS

This application claims priority to and the benefit thereof from U.S. Provisional Patent Application No. 62/529,082, filed Jul. 6, 2017, titled "Kayak V-Storage," the contents of which are hereby incorporated by reference in their entirety.

FIELD OF THE DISCLOSURE

The disclosure relates generally to an article storage and organizer, and, more particularly, a multidimensional storage and organizer for holding articles related to activities such as fishing, boating (e.g., kayaking, canoeing, etc.), hunting, camping, and various hobbies, among other things.

BACKGROUND OF THE DISCLOSURE

Campers and fishermen frequently use crates to store and transport desired gear and equipment. These crates can include milk crates. While providing a mechanism for storing and transporting gear and equipment, these crates do not provide any organizational or compartmentalized features. Moreover, the openings in the crates can result in gear falling out and be lost, or worse, accidentally stepped on in the case of fishing hooks, and the like.

An unfulfilled need exists for a practical, efficient, and easy to use multidimensional storage system that provides organization and/or compartmentalized features, and that securely holds articles.

SUMMARY OF THE DISCLOSURE

The instant disclosure provides a multidimensional storage system that satisfies the aforenoted unmet needs. The disclosure provides a multidimensional storage system that provides storage options many users, such as, for example, kayakers, canoeists, fishermen, campers, and others can benefit from. The storage system can be configured with a V-shape that wraps around a properly situated user with storage on either side for easy access that requires little mobility, which can be very beneficial in activities such as fishing from a kayak or canoe.

According to an aspect of the disclosure, a multidimensional storage system is provided for holding one or more articles. The storage system comprises a base having a plurality of inner walls and a floor that form a portion of a storage compartment, and an upper body that releasably attaches to the base. The upper body can comprise a main body that includes a chamber to hold one or more storage containers, and a pair of garages that can receive and hold one or more other storage containers. The main body and the pair of garages can be formed in a V-shape, an H-shape, a rectangle, a circle, or any other shape that does not depart from the scope or spirit of the disclosure. The upper body can pivot with respect to the base in at least one of a first direction and a second, opposite direction.

According to a further aspect of the disclosure, a multidimensional storage system is provided that comprises: an upper body that includes a main body and a garage that holds one or more storage containers; and a base that attaches to the upper body, wherein the garage is angled with respect to the main body in at least one of a horizontal plane and a vertical plane. The upper body can be releasably attached to the base. The multidimensional storage system can include a bulk storage compartment. The bulk storage compartment can be formed by inner walls of at least one of the main body and the base. The upper body can be configured to pivot with respect to the base in a first direction. The upper body can be further configured to pivot with respect to the base in a second direction. The multidimensional storage system can include a catch that latches a portion of the upper body to a portion of the base. The main body can include a chamber. The base can include feet that attach to a vessel. The upper body can include a handle to facilitate pivoting of the upper body with respect to the base in the first direction. The multidimensional storage system can include a rail system.

According to a further aspect of the disclosure, a multidimensional storage system is provided for holding one or more articles, the storage system comprising: a main body; and a pair of garages that hold one or more storage containers, wherein the main body and the pair of garages are angled to form a V-shape. The angle can range from, for example, about 0° to about 90° with respect to a plane that is perpendicular to the surface of the main body. The angle can be less than 0° or greater than 90°. Alternatively, the main body and the garage(s) can be formed in an H-shape, a rectangle, a circle, or any other shape that does not depart from the scope or spirit of the disclosure. A first wall of the main body can be formed to be substantially opposite and parallel to a second wall of the main body. At least one of the pair of garages can be angled with respect to the main body in at least one of a horizontal plane and a vertical plane. The multidimensional storage system can further comprise a base that attaches to the main body. The main body and the base can be releasably attached to each other. The main body can be configured to pivot with respect to the base in at least one of a first direction and a second direction. The first direction can be substantially opposite to the second direction. The multidimensional storage system can comprise a catch that latches a portion of the main body to the base.

Additional features, advantages, and embodiments of the disclosure may be set forth or apparent from consideration of the detailed description and drawings. Moreover, it is to be understood that the foregoing summary of the disclosure and the following detailed description and drawings are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it can be practiced.

Figure 1:
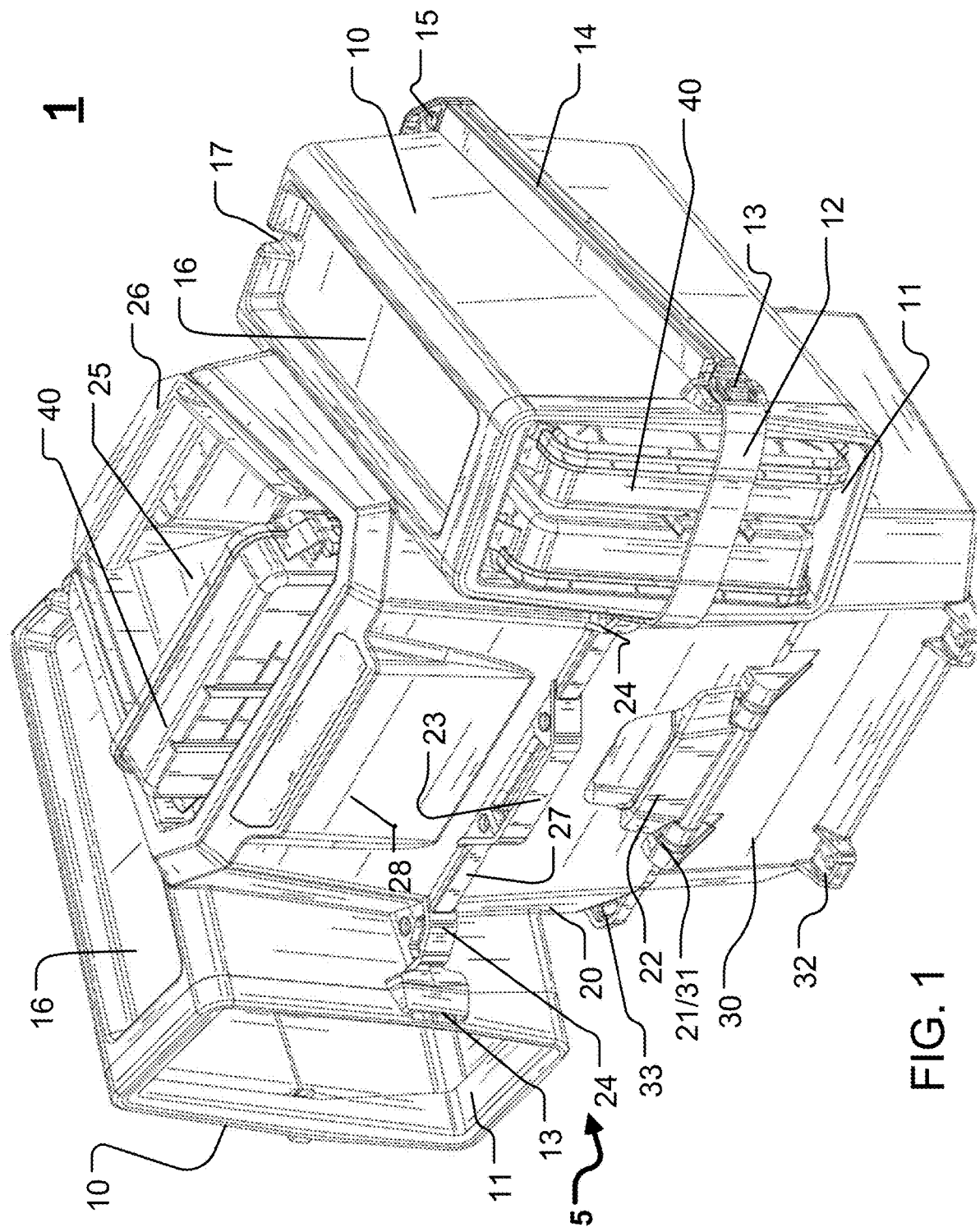
FIG. 1 shows a perspective view of an example of a multidimensional storage system constructed according to the principles of the disclosure.

The present disclosure is further described in the detailed description and drawings that follow.

DETAILED DESCRIPTION OF THE DISCLOSURE

The embodiments of the disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure, which is defined solely by the appended claims and applicable law. Moreover, it is noted that like reference numerals represent similar parts throughout the several views of the drawings.

FIG. 1 shows a perspective view of an embodiment of a multidimensional storage system 1, constructed according to the principles of the disclosure. As seen, the storage system 1 includes a main body 5. The storage system 1 can include one or more (preferably two) garages 10 that can be attached to or integrally formed with the main body 5. The storage system 1 can include an upper body 20. The upper body 20 can include the main body 5 and the one or more garages 10. The one or more garages 10 can be fixedly or removably attached to the main body 5. The one or more garages 10 can be integrally formed as a single piece with the main body 5. The storage system can include a base 30.

Figure 2:
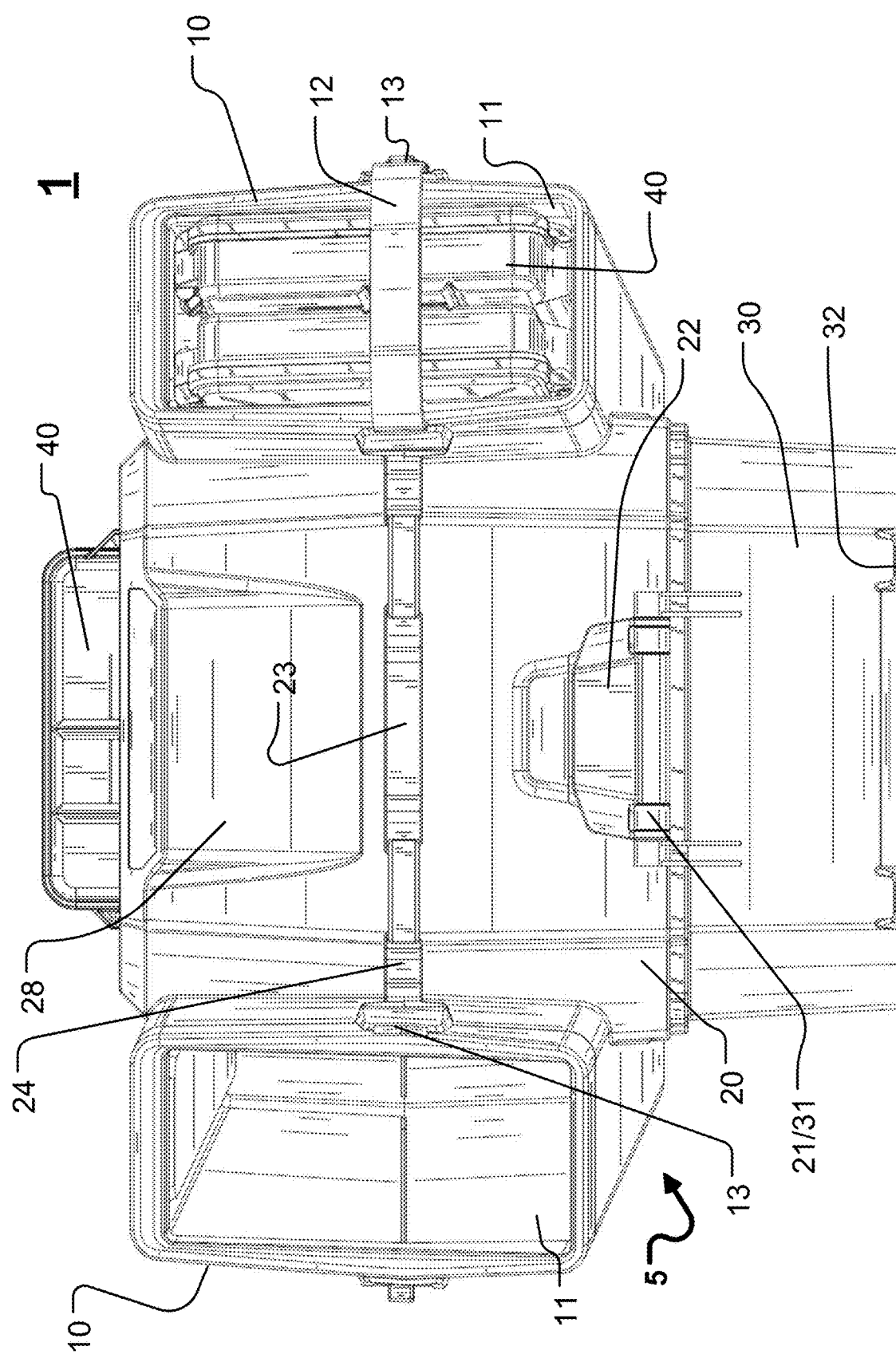
FIG. 2 shows a first (e.g., front) view of the storage system shown in FIG. 1.
Figure 3:
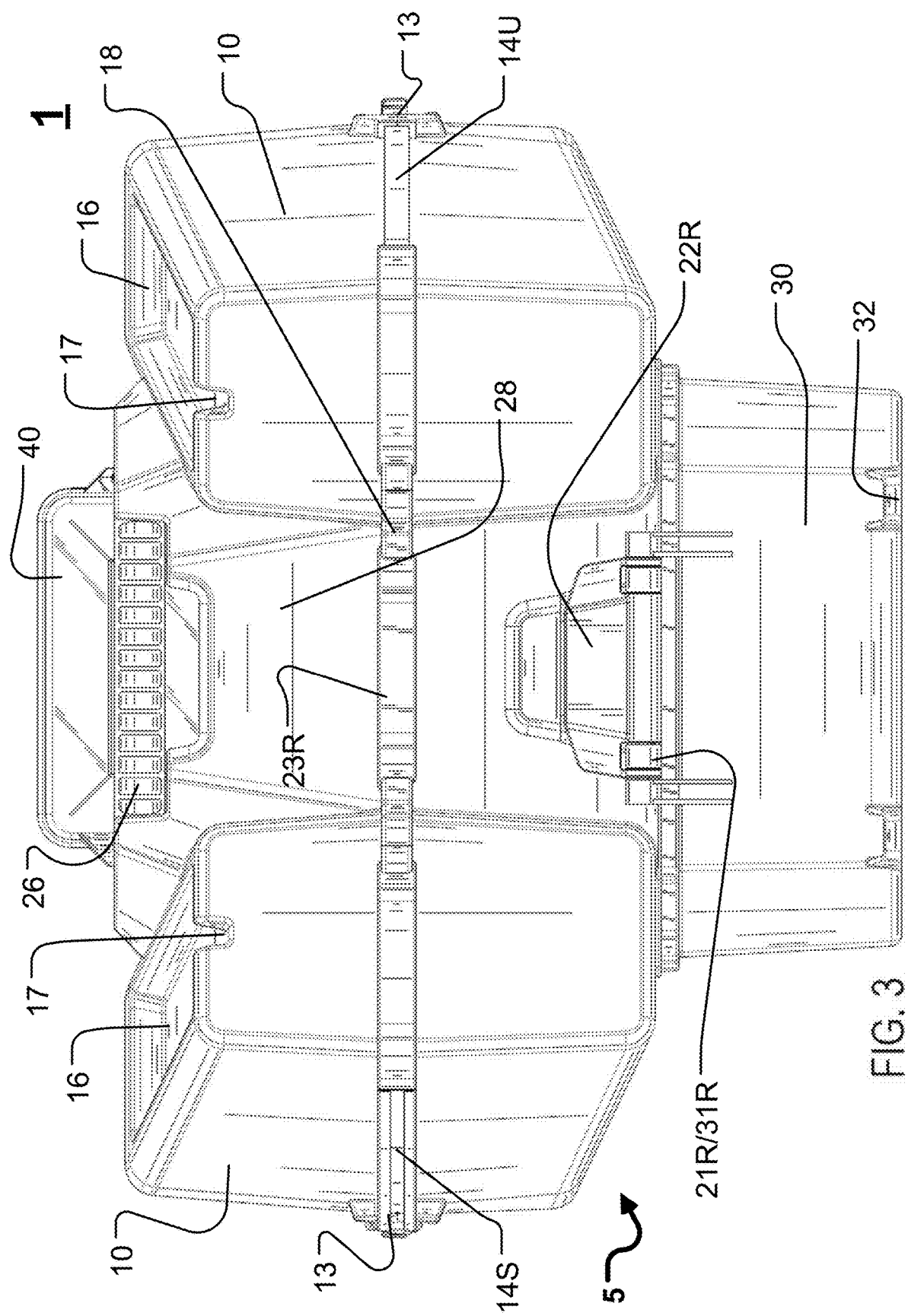
FIG. 3 shows a second (e.g., rear) view of the storage system shown in FIG. 1.
Figure 4:
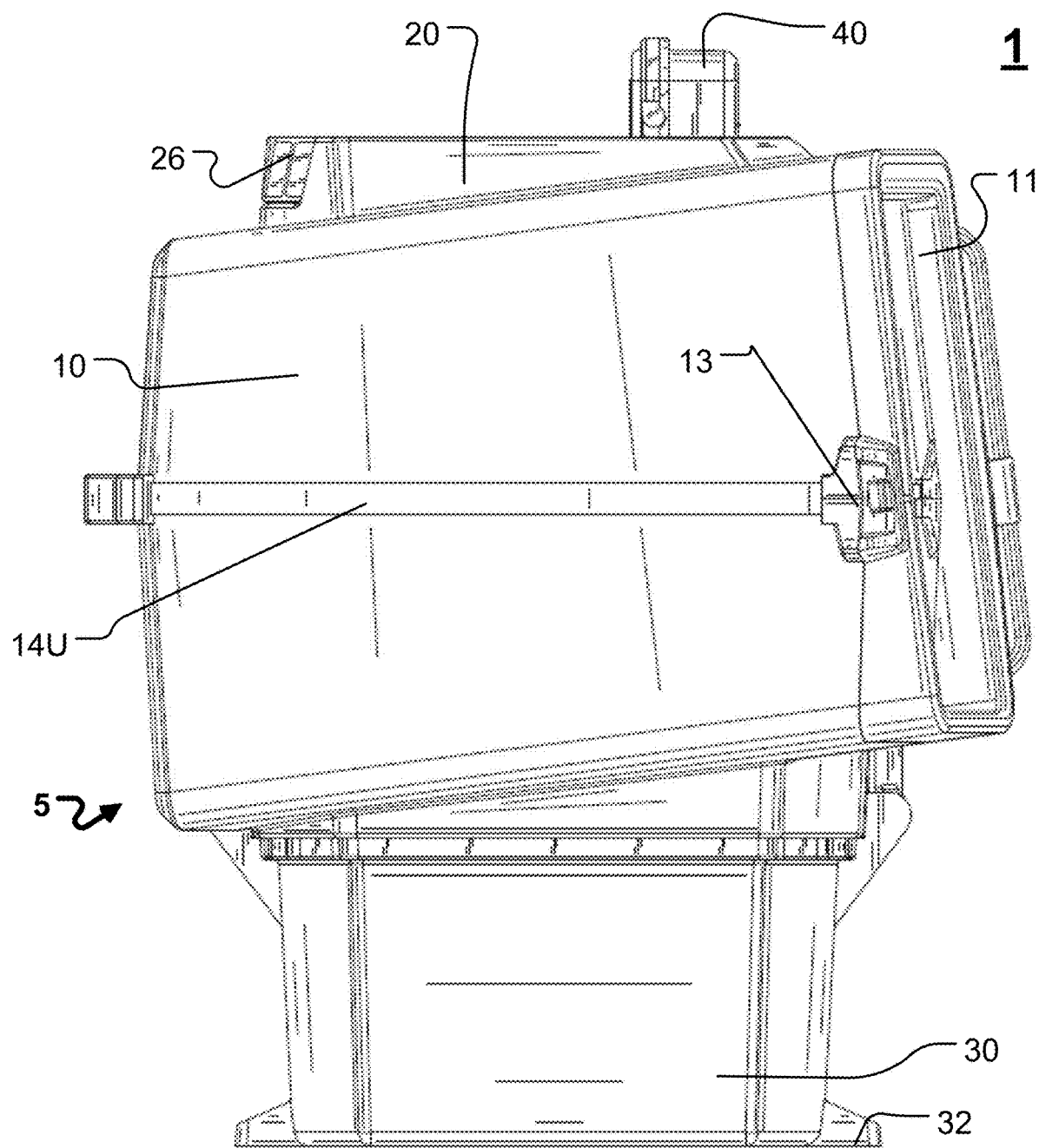
FIG. 4 shows a third (e.g., side) view of the storage system shown in FIG. 1.
Figure 5:
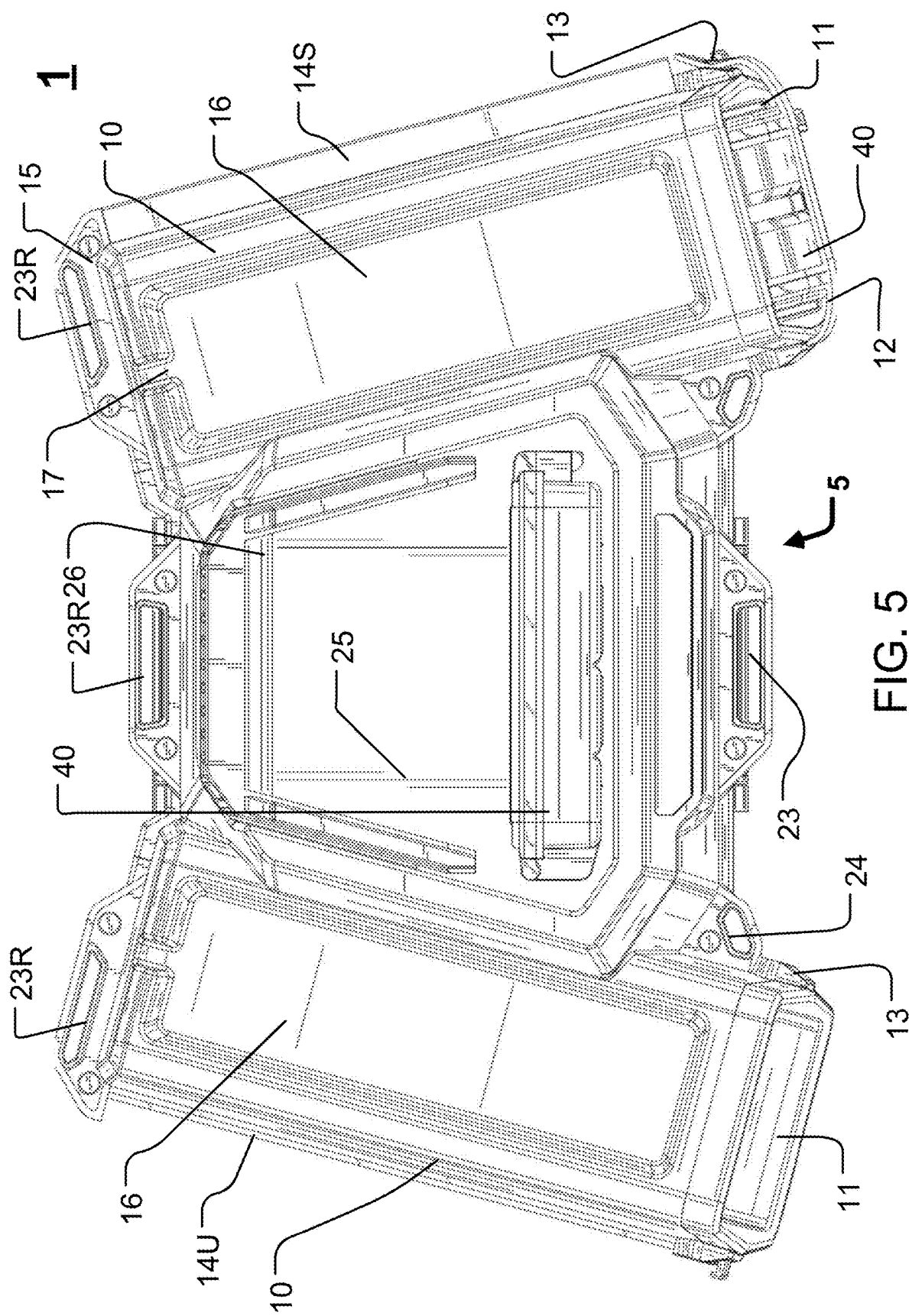
FIG. 5 shows a fourth (e.g., top) view of the storage system shown in FIG. 1.
Figure 6:
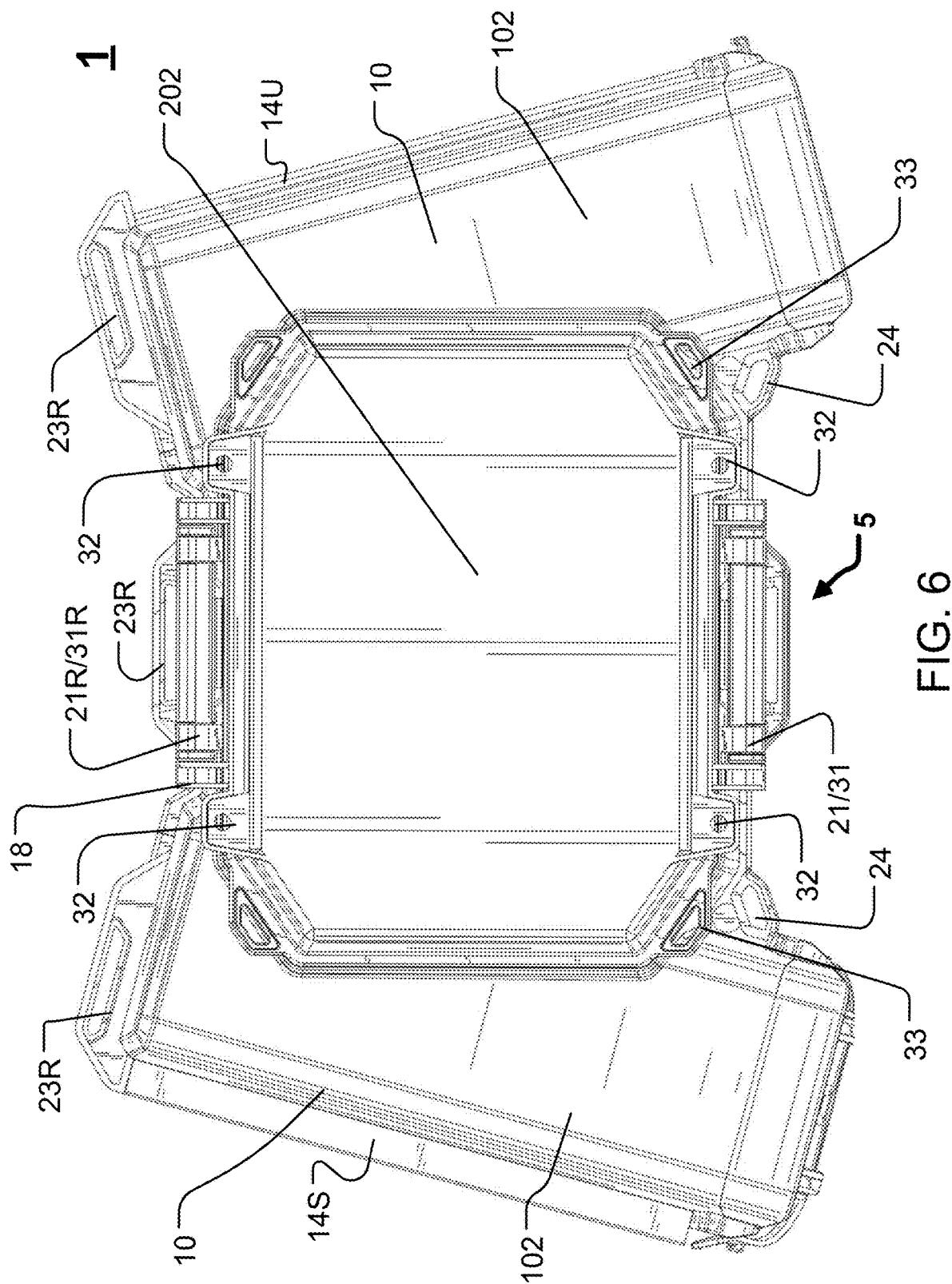
FIG. 6 shows a fifth (e.g., bottom) view of the storage system shown in FIG. 1.
Figure 7:
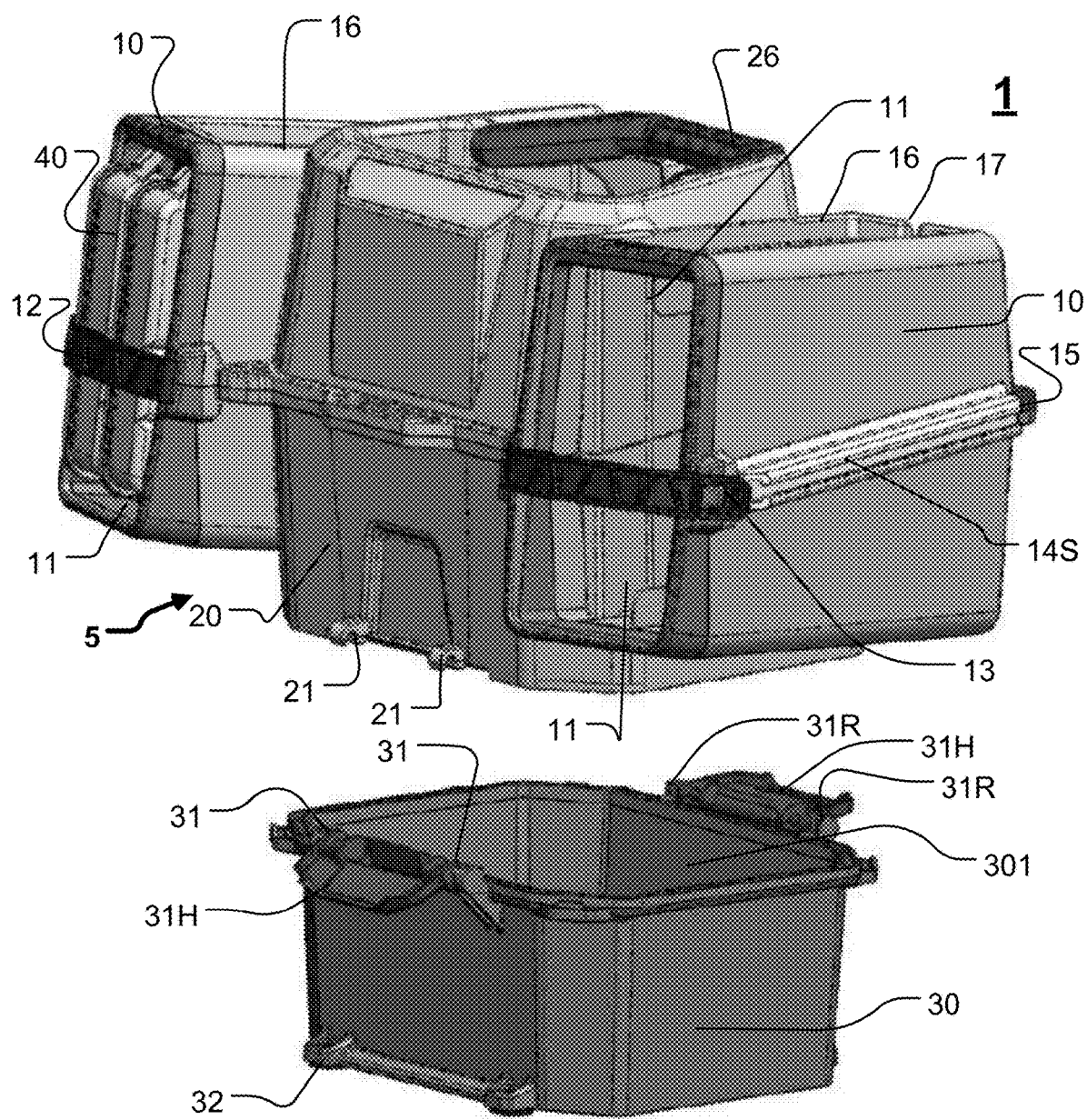
FIG. 7 shows a perspective view of the storage system in FIG. 1 with a base separated from a main body.
Figure 8:
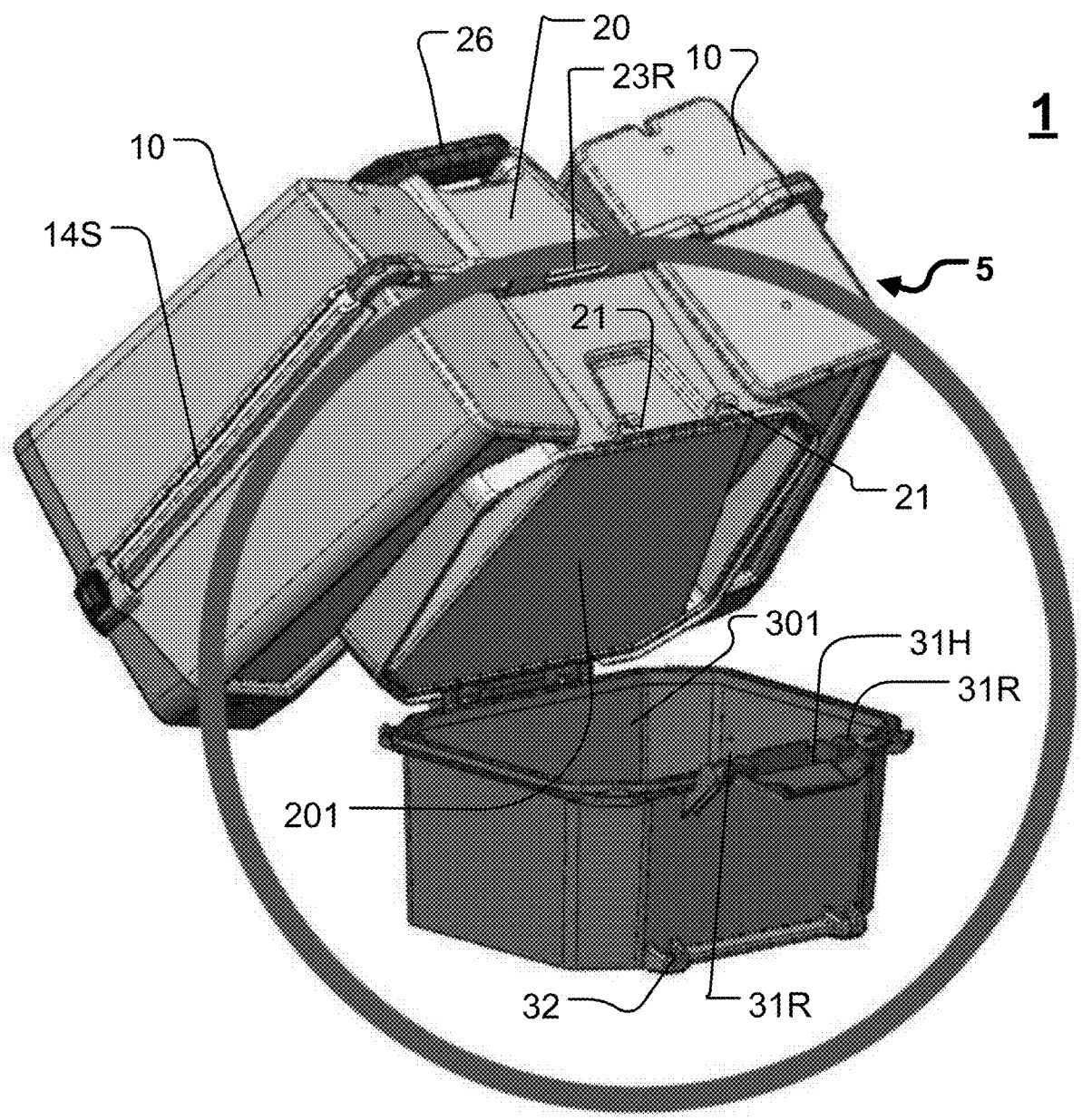
FIG. 8 shows the second (e.g., rear) view of the storage system in FIG. 1 with the main body pivoted away from the base.
Figure 9:
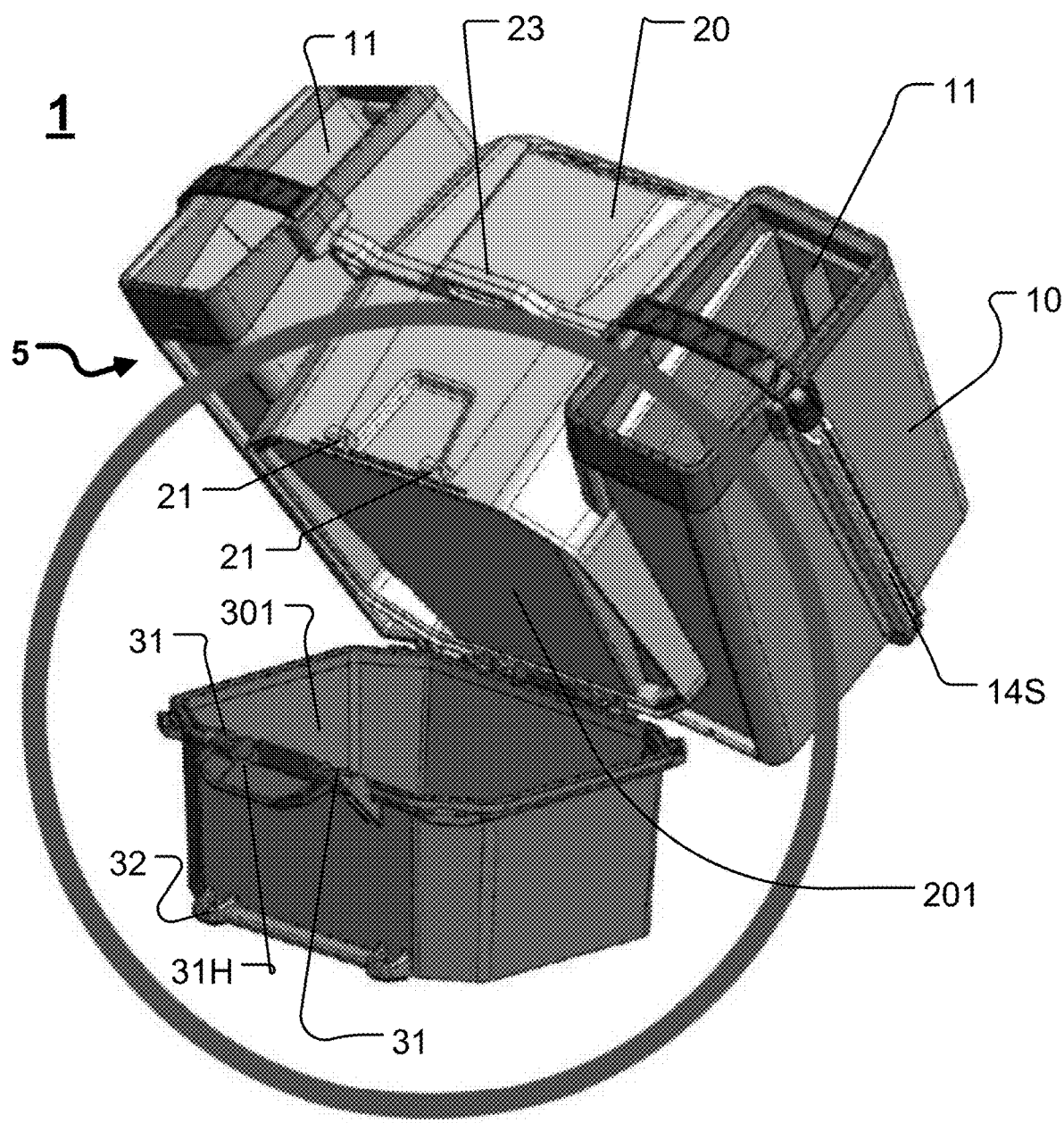
FIG. 9 shows the first (e.g., front) view of the storage system in FIG. 1 with the main body pivoted away from the base.

FIGS. 2-9 illustrate various views of the storage system 1, wherein: FIG. 2 shows a first (e.g., front) view of the storage system 1; FIG. 3 shows a second (e.g., rear) view of the storage system 1; FIG. 4 shows a third (e.g., side) view of the storage system 1; FIG. 5 shows a fourth (e.g., top) view of the storage system 1; FIG. 6 shows a fifth (e.g., bottom) view of the storage system 1; FIG. 7 shows a perspective view of the storage system 1 with the base 30 separated from the upper body 20; FIG. 8 shows the second (e.g., rear) view of the storage system 1 with the upper body 20 pivoted away from the base 30 in a first direction; and, FIG. 9 shows the first (e.g., front) view of the storage system 1 with the upper body 20 pivoted away from the base 30 in a second direction, opposite to the first direction.

The storage system 1, including the garages 10, upper body 20, and base 30, can be made of a material such as, for example, a plastic, a metal, wood, carbon fiber, or any other material that could be suitable for the various applications of the storage system 1, as understood by those skilled in the art. The inner chambers (or compartments) of the garages 10, upper body 20, and/or base 30 can be insulated so as to maintain a temperature within a desired temperature range for extended periods of time, thereby keeping items such as beverages, food, bait, etc., cold, or keeping beverages, food, etc. warm, depending on the application.

The storage system 1 provides optimal accessibility, flexibility, and adaptability. As seen in FIG. 1, the storage system 1 can have an elevated V-shape that can position storage containers closer to an angler's sides when properly positioned with respect to the storage system 1. The storage containers can include, for example, one or more STOW-AWAY® storage containers. The angled shape of the storage system 1 can facilitate easy access to storage containers stored behind the angler on either side.

The storage system 1 can include a bulk storage space 301 (shown in FIGS. 7-9) for storing articles such as, for example, an anchor, raingear, food, equipment, and other items. The bulk storage space 301 can be formed in the base 30. Additionally, the bulk storage space 301 can be formed to have a greater capacity than that provided by the walls and floor of the base 30 by, for example, forming a cavity 201 (shown in FIGS. 8-9) in a portion of the main body 5, such that when the upper body 20 is in a fully attached configuration (shown in FIG. 1), the bulk storage space 301 also includes the cavity 201 and, therefore, can hold items significantly larger than the space provided in the base 30 alone.

The storage system 1 can be configured to provide a waterproof seal for the bulk storage space 301 when the upper body 20 is in the fully attached configuration with the base 30 (shown in FIG. 1). The bulk storage space 301 can include one or more compartments (not shown) that can provide dry storage for such items as, for example, a phone, a wallet, or other items.

The garage(s) 10 can be pivotally attached to the main body 5. The main body 5 and the garage(s) 10 can be angled to form a V-shape. The angle formed between, for example, a longitudinal axis of a cavity in the garage 10 and a plane that is perpendicular to the front surface of the main body 5 can range from, for example, about 0° to about 90°. The angle can be less than 0° or greater than 90°. Alternatively, the main body 5 and the garage(s) 10 can be formed in an H-shape, a rectangle, a circle, or any other shape that does not depart from the scope or spirit of the disclosure.

According to an implementation, the garage 10 can be attached pivotally at one end to the main body 5, and the other end of the garage 10 can be formed to detach and pivot away from or toward the main body 5. The garage 10 can pivot in a horizontal plane of the storage system 1. For instance, the garage 10 can be attached by a pivot hinge (not shown) at 18 (shown in FIG. 3). The garage 10 can be detachably attached at 24 (shown in FIG. 1) by a latch device (not shown), such that a front portion of the garage 10 can be unlatched and swung outward, away from the main body 5.

The garage 10 can be rotatably attached to the main body 5 by a rotational attachment device (not shown), such that the garage 10 can be rotated with respect to the main body 5. The garage 10 can be rotated in a vertical plane of the storage system 1. In this regard, the rotational attachment device can include, for example, swivel bearings. The rotational attachment device can be attached to a wall portion (not shown) of the garage 10 and/or a wall portion (not shown) of the main body 5, thereby allowing the garage 10 to swivel or rotate with respect to the main body 5.

The garage 10 can include an opening 11 that provides access to a cavity in the garage 10. The cavity can be configured to receive and hold one or more trays 40. The opening 11 can include a door (not shown) to seal the opening 11.

The garage 10 and/or the main body 5 can include a rail system 14 around its perimeter. The rail system 14 can be configured to mount one or more articles such as, for example, rod holders, a camera, a transducer, or the like. The rail system 14 can include one or more openings 15. The rail system 14 may include an inner track 14U (shown in FIG. 3). The inner track 14U can be covered by a cover 14S. The inner track 14U can be configured for universally attaching to auxiliary items, such as, for example, fishing rod supports, cup holders, lights, etc.

The garage 10 can include a restrainer 12 to secure contents (e.g., trays 40) in the garage 10. The restrainer 12 can include a strap, a cord, a bungee cord, a bar, a door, or the like. The restrainer 12 can be fastened at one end to an attachment mechanism 13, which can include a latch, a hook, a pin, a hook-and-loop, an adhesive, or the like. The restrainer 12 can be fastened at the other end to another attachment mechanism 13.

The garage 10 can include a recessed tray 16. The recessed tray 16 can include a tray opening 17 to allow fluid to flow from the recessed tray 16. The recessed tray 16 can be integrally formed (e.g., as a single piece) with the main body 5, or attached to the main body 5. The recessed tray 16 can be removably attached to the main body 5.

The corners of the garage 10 and/or main body 5 can be chamfered.

The upper body 20, which include the main body 5, can be detachably affixed to the base 30 by one or more catches 22 (22R, shown in FIG. 3). The catch 22 can include a pivot hinge 21/31 (21R/31R, shown in FIG. 3). The pivot hinge portion 21 can be integrally formed with or attached to a wall of the upper body 20. The pivot hinge portion 31 can be integrally formed with or attached to a wall of the base 30. The catch 22 and pivot hinge 21/31 are constructed to remain securely attached in the locked position to both the wall of the upper body 20 and the wall of the base 30 as the wall of the upper body 20 pivots with respect to the wall of the base 30 (shown in FIGS. 8 and 9). However, when the catch 22 is released, such as by gripping the catch 22 and pulling it away from the main body 5, the pivot hinge 21/31 releases, thereby allowing for disconnection of the pivot hinge portion 21 from the pivot hinge portion 31 and removal of the wall of the upper body 20 from the wall of the base 30. The catch 22R and pivot hinge 21R/31R can be constructed to be substantially the same as catch 22 and pivot hinge 21/31.

The catch 22 (and/or catch 22R) and pivot hinge 21/31 (and/or 21R/31R) can be designed for one or two way pivoting, as shown in FIGS. 8 and 9, and/or for complete removal of the upper body 20 from the base 30, as shown in FIG. 7.

The upper body 20 can include one or more handles 23. The handle 23 can be configured to be gripped so as to pivot the upper body 20 away from the base 30, as shown in FIG. 9, providing access to the bulk storage space (or compartment) 301 from one side (e.g., front side) of the storage system 1. The upper body 20 can include one or more similar handles 23R on the opposite side (e.g., rear side) of the upper body 20, which can be gripped to pivot the upper body 20 away from the base 30, as shown in FIG. 8, providing access to the bulk storage space 301 from the other side (e.g., rear) of the storage system 1. Alternatively, both the handles 23, 23R can be gripped simultaneously and pulled to separate the entire upper body 20 from the base 30, as shown in FIG. 7.

The upper body 20 can include one or more fasteners at the points 24 of the upper body 20. The fasteners can be formed with or attached to a rail system 27, which can be formed with attached to the upper body 20. The fasteners can include one or more openings so as to receive, for example, a bungee cord end, a rod support hook, a cup holder hook, etc.

Upper body 20 can include a chamber 25, which may be formed a top portion of the upper body 20, as seen in FIG. 1. The chamber 25 can be configured to receive and hold one or more trays 40. The upper body 20 can include a door (not shown) or a lid (not shown), so as to enclose the chamber 25. The upper body 20 can include a handle 26, so as to allow a user to carry the upper body 20 using only a single hand.

The upper body 20 can include an inner chamber (not shown), which may be accessed through, for example, an opening (not shown) in a wall 28 of the main body 5 (shown in FIGS. 1-3), or a floor (not shown) in the chamber 25. The opening can be sealed with a door (not shown) or lid (not shown).

The base 30 can include the bulk storage space 301, shown in FIGS. 7-9. The base 30 can include feet 32 and/or base fasteners 33 with one or more attachment mechanisms, each of which can include an opening, a hook, a loop, a hook-and-loop, a bolt, a screw, a strap, or the like. The base fasteners 33 can include an opening to receive, for example, a bungee cord end, a rod support hook, a cup holder hook, etc.

As seen in FIG. 7, the storage system 1 can be configured such that the upper body 20 can be removable from the base 30 for easy transport. Alternatively, as seen in FIGS. 8-9, the upper body 20 may be angled to one side with respect to the base 30 to provide lower clearance, such as might be desirable when traveling through a low clearance bridge via a kayak.

As seen FIGS. 1-9, the storage system 1 can include a base 30 that is compact. The base 30 can be elevated to allow for use in many vessels (e.g., kayaks, canoes, etc.) regardless of hull/cockpit design. The base 30 can be configured to open to provide waterproof storage. The upper body 20 and base 30 can pivot into open position to angle the upper body 20 backwards when, for example, low clearance is necessary (FIG. 9). The base 30 can include feet 32 with one or more attachment mechanisms to provide balance to the storage system 1. The feet 32 and/or base fasteners 33 can provide an option to permanently secure the base 30 to a surface such as, for example, a kayak or canoe hull; and/or detach from the upper body 20 if desired, for transportation.

As seen in the various figures, the storage system 1 includes one or more storage container garages 10. Each garage 10 can hold one or more storage container trays 40 (e.g., four storage container trays 10). The storage container trays (or "storage containers") can be angled backwards and secured in place with the restrainer 12 to keep the storage container(s) 40 from unintentionally sliding out of the garage 10.

According to an embodiment of the disclosure, the storage system 1 provides optimal accessibility, flexibility, and adaptability.

The terms "including," "comprising" and variations thereof, as used in this disclosure, mean "including, but not limited to," unless expressly specified otherwise.

The terms "a," "an," and "the," as used in this disclosure, means "one or more," unless expressly specified otherwise.

The term "fastener," as used in this disclosure, means, for example, a buckle (e.g., a side-release buckle), a hook-and-loop (e.g., VELCRO™), a zipper, a button, a snap-button, a rivet, a pin, a stitching, an adhesive, a staple, a clip, a clamp, a tie-in, a lock, a clinch, a toggle bolt, a nut, a bolt, a hoop, a loop, a hook, or any other device or mechanism that can attach a portion of one article to a portion of another article, or that can be attached to an article.

Although process steps, method steps, or the like, may be described in a sequential order, such processes or methods may be configured to work in alternate orders. In other words, any sequence or order of steps that may be described does not necessarily indicate a requirement that the steps be performed in that order. The steps of the processes or methods described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications, or modifications of the disclosure.

What is claimed is:

1. A multidimensional storage system for holding one or more articles, the storage system comprising:
    a base having a plurality of inner walls and a floor that form a portion of a storage compartment; and
    an upper body that releasably attaches to the base, the upper body comprising
        a main body that includes a chamber that holds one or more storage containers and
        a pair of garages that receive and hold one or more other storage containers,
        wherein the main body and the pair of garages form a v-shape,
    wherein the upper body pivots with respect to the base in at least one of a first direction and a second, opposite direction.

2. The multidimensional storage system of claim 1, further comprising a bulk storage compartment.

3. The multidimensional storage system of claim 2, wherein the bulk storage compartment is formed by inner walls of at least one of the main body and the base.

4. The multidimensional storage system of claim 1, wherein the upper body is configured to pivot with respect to the base in the first direction.

5. The multidimensional storage system of claim 4, wherein the upper body is further configured to pivot with respect to the base in the second direction.

6. The multidimensional storage system of claim 1, further comprising a catch that latches a portion of the upper body to a portion of the base.

7. The multidimensional storage system of claim 1, wherein the main body comprises a chamber.

8. The multidimensional storage system of claim 1, wherein the base comprises feet or base fasteners that attach to a vessel.

9. The multidimensional storage system of claim 1, further comprising a handle to facilitate pivoting of the upper body with respect to the base in the first direction.

10. The multidimensional storage system of claim 1, further comprising a rail system.

11. The multidimensional storage system of claim 1, wherein the garage is angled with respect to the main body in at least one of a horizontal plane and a vertical plane.

12. The multidimensional storage system of claim 1, wherein a first wall of the main body is substantially opposite and parallel to a second wall of the main body.

13. The multidimensional storage system of claim 1, wherein at least one of the pair of garages is angled with respect to the main body in at least one of a horizontal plane and a vertical plane.

14. The multidimensional storage system of claim 1, wherein the base attaches to the main body.

15. The multidimensional storage system of claim 14, wherein the main body and the base are releasably attached to each other.

16. The multidimensional storage system of claim 14, wherein the main body is configured to pivot with respect to the base in at least one of the first direction and the second direction.

17. The multidimensional storage system of claim 16, further comprising a catch that latches a portion of the main body to the base.

* * * * *